(12) United States Patent
Glickman et al.

(10) Patent No.: US 12,625,872 B2
(45) Date of Patent: *May 12, 2026

(54) GENERATING OVERLAP QUERIES ON A DATABASE SYSTEM

(71) Applicant: Snowflake Inc., Bozeman, MT (US)

(72) Inventors: Matthew J. Glickman, Larchmont, NY (US); Orestis Kostakis, Redmond, WA (US); Justin Langseth, Kailua, HI (US)

(73) Assignee: Snowflake Inc., Bozeman, MT (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/659,616

(22) Filed: May 9, 2024

(65) Prior Publication Data

US 2024/0296162 A1 Sep. 5, 2024

Related U.S. Application Data

(63) Continuation of application No. 17/804,434, filed on May 27, 2022, now Pat. No. 12,008,001.

(51) Int. Cl.
*G06F 16/2455* (2019.01)
*G06F 16/242* (2019.01)

(52) U.S. Cl.
CPC ...... *G06F 16/24568* (2019.01); *G06F 16/244* (2019.01); *G06F 16/2456* (2019.01); *G06F 16/24564* (2019.01)

(58) Field of Classification Search
None
See application file for complete search history.

(56) References Cited

U.S. PATENT DOCUMENTS

| | | | |
|---|---|---|---|
| 8,190,628 | B1 | 5/2012 | Yang et al. |
| 11,216,580 | B1 | 1/2022 | Holboke et al. |
| 11,836,138 | B1 | 12/2023 | Glickman et al. |
| 12,008,001 | B2 | 6/2024 | Glickman et al. |
| 2004/0002956 | A1 | 1/2004 | Chaudhuri et al. |
| 2004/0064441 | A1 | 4/2004 | Tow |

(Continued)

OTHER PUBLICATIONS

"U.S. Appl. No. 17/804,434, Non Final Office Action mailed Aug. 2, 2022", 16 pgs.

(Continued)

*Primary Examiner* — Son T Hoang
(74) *Attorney, Agent, or Firm* — Schwegman Lundberg & Woessner, P.A.

(57) ABSTRACT

An advanced system for refining overlap queries in a database system based on user feedback. The system monitors interactions of a first user with a first dataset on the database system, where the first dataset is associated with the first user. Feedback regarding the quality of a results dataset, generated from an executed overlap query, is received from the first user. This feedback informs the generation of a similarity score dataset that enhances the creation of new overlap queries. These new overlap queries are designed to output refined overlap datasets between the first dataset and a second dataset associated with a second user. A new joined dataset is generated by executing these overlap queries, comprising data from both the first and second datasets. A new results dataset is generated, providing the first user with refined recommendations based on additional feedback.

20 Claims, 7 Drawing Sheets

(56) References Cited

U.S. PATENT DOCUMENTS

| | | | |
|---|---|---|---|
| 2010/0037161 A1* | 2/2010 | Stading | G06F 16/25 |
| 2014/0229498 A1* | 8/2014 | Dillon | G06F 16/337 707/767 |
| 2016/0307113 A1 | 10/2016 | Calapodescu et al. | |
| 2017/0060950 A1 | 3/2017 | Budhiraja et al. | |
| 2017/0262491 A1 | 9/2017 | Brewster et al. | |
| 2017/0364561 A1* | 12/2017 | Wu | G06F 16/2456 |
| 2019/0236192 A1 | 8/2019 | Zou et al. | |
| 2019/0251184 A1* | 8/2019 | Shan | G06F 16/24578 |
| 2019/0303801 A1 | 10/2019 | Horton et al. | |
| 2019/0384762 A1* | 12/2019 | Hill | G06F 16/2272 |
| 2020/0272651 A1 | 8/2020 | Luo et al. | |
| 2020/0356873 A1 | 11/2020 | Nawrocke et al. | |
| 2021/0019318 A1 | 1/2021 | Leung et al. | |
| 2021/0232592 A1* | 7/2021 | Liao | G06F 16/258 |
| 2021/0326369 A1* | 10/2021 | Roitman | G06F 16/353 |
| 2022/0067056 A1 | 3/2022 | Sexton | |
| 2022/0067591 A1 | 3/2022 | Patel et al. | |
| 2022/0138559 A1 | 5/2022 | Gangi Reddy et al. | |
| 2023/0385284 A1 | 11/2023 | Glickman et al. | |
| 2023/0385286 A1 | 11/2023 | Glickman et al. | |

OTHER PUBLICATIONS

"U.S. Appl. No. 17/804,434, Examiner Interview Summary mailed Nov. 1, 2022", 2 pgs.

"U.S. Appl. No. 17/804,434, Response filed Nov. 2, 2022 to Non Final Office Action mailed Aug. 2, 2022", 18 pgs.

"U.S. Appl. No. 17/804,434, Final Office Action mailed Dec. 15, 2022", 18 pgs.

"U.S. Appl. No. 18/162,688, Preliminary Amendment filed Feb. 2, 2023", 10 pgs.

"U.S. Appl. No. 17/804,434, Response filed Mar. 15, 2023 to Final Office Action mailed Dec. 15, 2022", 15 pgs.

"U.S. Appl. No. 17/804,434, Examiner Interview Summary mailed Mar. 17, 2023", 2 pgs.

"U.S. Appl. No. 17/804,434, Amendment and Response Filed Mar. 10, 2023 to Final Office Action Mailed Dec. 15, 2022", 15 pgs.

"U.S. Appl. No. 17/804,434, Non Final Office Action mailed Apr. 6, 2023", 18 pgs.

"U.S. Appl. No. 18/162,688, Non Final Office Action mailed Apr. 6, 2023", 29 pgs.

"U.S. Appl. No. 18/162,688, Response filed Jun. 30, 2023 to Non Final Office Action mailed Apr. 6, 2023", 14 pgs.

"U.S. Appl. No. 17/804,434, Response filed Jul. 6, 2023 to Non Final Office Action mailed Apr. 6, 2023", 11 pgs.

"U.S. Appl. No. 17/804,434, Examiner Interview Summary mailed Jul. 10, 2023", 2 pgs.

"U.S. Appl. No. 18/162,688, Notice of Allowance mailed Jul. 19, 2023", 14 pgs.

"U.S. Appl. No. 17/804,434, Final Office Action mailed Sep. 20, 2023", 18 pgs.

"U.S. Appl. No. 18/162,688, Notice of Allowance mailed Oct. 12, 2023", 14 pgs.

"U.S. Appl. No. 17/804,434, Response filed Dec. 20, 2023 to Final Office Action mailed Sep. 20, 2023", 15 pgs.

"U.S. Appl. No. 17/804,434, Examiner Interview Summary mailed Dec. 22, 2023", 2 pgs.

"U.S. Appl. No. 17/804,434, Notice of Allowance mailed Feb. 2, 2024", 18 pgs.

* cited by examiner

GENERATING OVERLAP QUERIES ON A DATABASE SYSTEM

PRIORITY CLAIM

This application is a Continuation of U.S. patent application Ser. No. 17/804,434, filed May 27, 2022, the contents of which are hereby incorporated by reference.

TECHNICAL FIELD

The present disclosure generally relates to efficiently managing combining data in a distributed database.

BACKGROUND

Databases are used for data storage and access in computing applications. A goal of database storage is to provide enormous sums of information in an organized manner so that it can be accessed, managed, and updated. In a database, data may be organized into rows, columns, and tables. Data from different datasets can be combined to form a combined dataset which can be queried.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
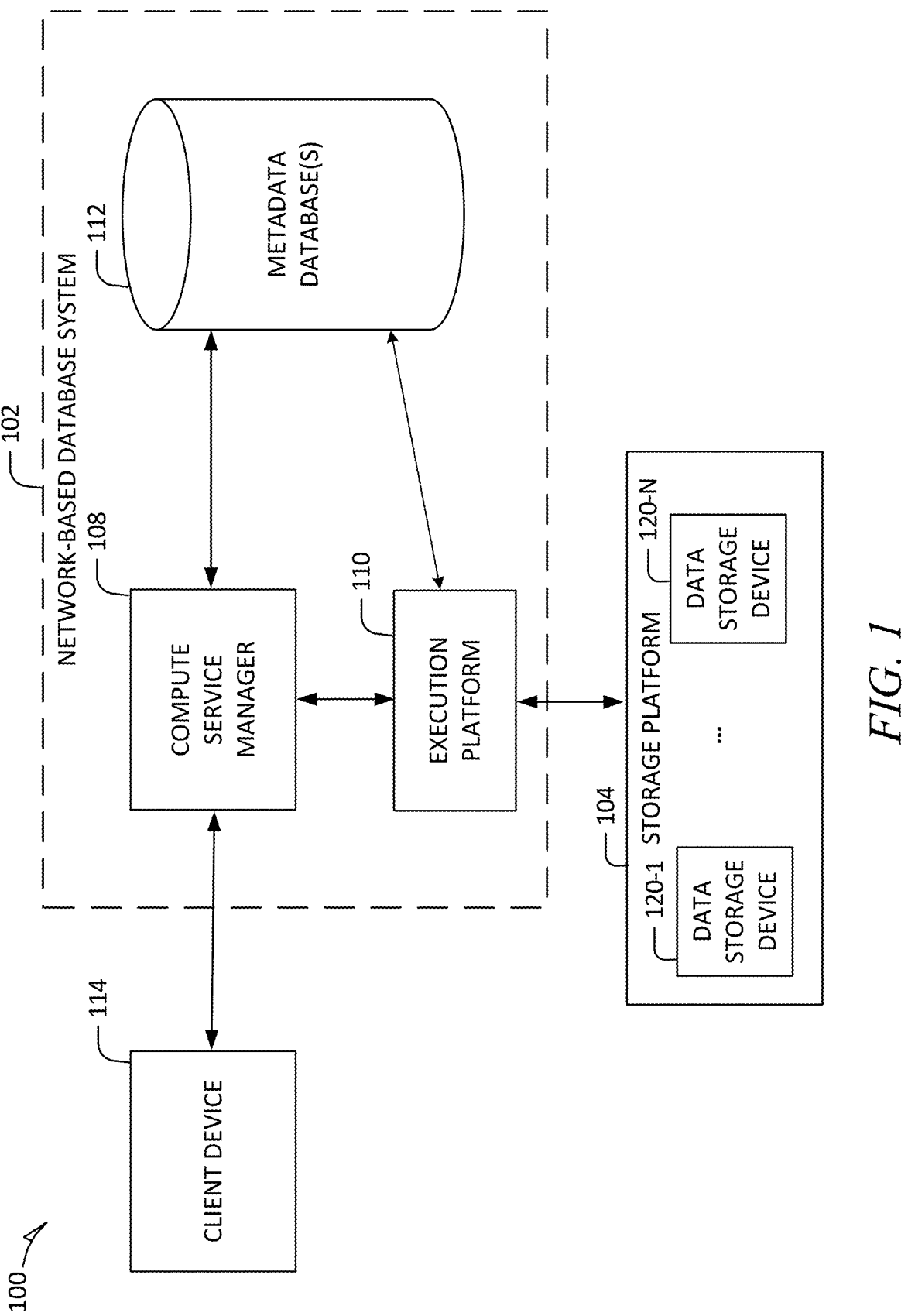
FIG. 1 illustrates an example computing environment in which a network-based database system can implement an overlap data system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some example embodiments, a distributed database can provide each user controlled access to datasets for other users in a data marketplace or anonymizing data clean room. Data analyst users that work with data in order to extract business value strive to enrich their data by combining other data sources using the shared access provided by the distributed database. For example, a user may browse and search for useful datasets and "join" (e.g., perform a SQL JOIN operation on, followed by a SQL SELECT on) them with their original data that they want to enrich. A goal for users of the shared datasets is that by searching and browsing the available shared datasets, the user will discover data stored in tables that contain fields (columns) similar/identical to those in their original data tables (to be able to join), and that they will be able to get novel information from the non-common fields. However, in a data marketplace with a large number of datasets, finding datasets that are joinable is a cumbersome task. Even if the user comes across a suitable dataset, the user then must expend time, effort, and computational resources to confirm if it is a "joinable" dataset (for example, to confirm that the user's data and the potential target data has a congruent schema, that the user's data and the potential target data will produce matches, and each dataset has key fields that match so that when the datasets are joined there will be matches).

To this end, an overlap data system is configured to identify problems to a given user that are solvable using overlap queries on an overlap dataset (e.g., recommend to users the actual problems that they can solve via overlaps, if they were to enrich (e.g., join) their existing data, with some of the suitable datasets that the overlap data system has automatically identified as being congruent datasets with which the user can join their data). As an example, the overlap data system first categorizes the datasets. For instance, for each dataset (e.g., table) in the shared data access database service (e.g., a web-browsable data marketplace of the distributed database), for each column, the overlap data system identifies the semantic type (e.g., while a column-name may be "LOCATION," the data type is a string or number, but the semantic type is actually a ZIP code). After semantic categorization of the schema (e.g., columns), overlap data system analyzes a given users' existing data (e.g., tables) in a distributed database by extracting important information such as the semantic types for each table as well as statistical information (e.g., number of rows, number of distinct values/pairs/triples, value-distribution of duplicate values/pairs/triples). Next, for each dataset in the shared data access database service, the overlap data system compares the sets of semantic types for that dataset and the user's data.

In some example embodiments, the overlap data system stores a set of common and non-common columns in each dataset for use in ordering the other user sets as similar and identifying queries based on non-matching data (e.g., non-matching columns).

In some example embodiments, the overlap data system then computes the value of similarity functions between the user's data and data-entities in the shared data access database service. The similarity function can consider all the available information: the number of features (e.g., columns) that are joinable across the two tables, the statistical information, and the number of records that are matched or produced as part of the JOIN operation. The latter is a more computational-heavy operation and requires operating on the data, which could be huge, versus the table metadata, which may depend only on the number of columns.

In some example embodiments, once a recommended join and queries are performed by users, the users are prompted to input feedback scores describing the quality of the datasets that the user's own data got joined against, and the quality of the query or results data. In those example embodiments, the user feedback scores are then further integrated into generation of the similarity scores above to further improve recommendations for joining against different users' datasets.

In some example embodiments, the overlap data system then orders (e.g., sorts, ranks) the results based on the similarity-function scores, and filters based on a threshold value (e.g., a sufficient number of hits or rows will be returned if the join is performed on the two datasets, and further, running a select statement on the joined set will yield sensical results, or other additional quality control rules to ensure the output of the query is of quality and not nonsensical). In some example embodiments, the threshold value can be determined independently and can depend on a wide range of factors (e.g., if the overlap data system is set for precision, the overlap data system applies higher thresholds, whereas if the overlap data system is set to provide a wider range, then a lower threshold is implemented). In some example embodiments, the other user's datasets can be sorted based on different criteria (e.g., how many fields (e.g., columns) are joinable, how many values match during an inner-join thus producing more rows).

In some example embodiments, the overlap data system then determines the semantic-types of the non-common columns for each of the other user's datasets, which is then used to identify one or more problem and solution analysis to the user, along with overlap queries to perform the problem and solution analysis. In some example embodiments, the problems, solutions, and overlap queries can be determined by the overlap data system based on single "output" columns, but also on more-than-one columns. In some example embodiments, the problems, solutions, and overlap queries are implemented manually as hard-coded/predefined rules (e.g., if ZIP-code then recommend geographic analysis with a plurality of preconfigured overlap queries). In some example embodiments, the problems, solutions, and overlap queries are derived using a machine learning scheme trained to classify types of overlap queries used from what data matches in other datasets and what queries the users of those datasets have historically used. In some example embodiments, the different recommendations are then stored in a rule repository for use by different users of different datasets. A user can then select a given overlap query recommended to them before they identify a given problem to solve, and the overlap data system performs the join and executes the query for overlap analysis on the fly.

As an additional example, assume a database user runs a clothes e-store. This user has a table with all their transactions, where the column-names are: ["CC," "PurchaseDate," "NameOnCard," "Total"]. The overlap data system then extracts the semantic type for each column to yield: CC Number, date, name, number, respectively. Among the datasets in the shared data access database service, a credit score company may have a table called "CreditCards" with the following column-names: ["Name, "DoB," "Location," "Number"], which are extracted by the overlap data system to: name, Date of Birth, ZIP code, CC Number.

For this pair of the clothes e-store user and the credit score company, the set of common columns are of semantic type: {Name, CC Number}. Further, the non-common semantic types on the side of the shared data access database service dataset are {ZIP code, Date of Birth}. The overlap data system then computes the similarity data and determines that the credit score company's dataset is above the threshold, as discussed below. The, by examining the non-common semantic types on the side of the shared data access database service dataset ({ZIP code, Date of Birth}), the overlap data system determines that the problem that the users can solve are in the area of "cohort analytics" (e.g., behavioral analytics that breaks the data in a dataset into related groups before analysis.), and in particular, for example, age-segmentation if looking at DoB and geographical analysis if looking at ZIP code.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts, such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is partitioned and organized in remote data storage systems (e.g., the cloud storage platform 104) and the local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for an extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata database 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata databases 112, execution platform 110, and cloud storage platform 104 are shown in FIG. 1 as individual discrete components. However, each of the compute service manager 108, metadata databases 112, execution platform 110, and cloud storage platform 104 may be implemented as a distributed system (e.g., distributed across multiple systems/platforms at multiple geographic locations). Additionally, each of the compute service manager 108, metadata databases 112, execution platform 110, and cloud storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, may be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
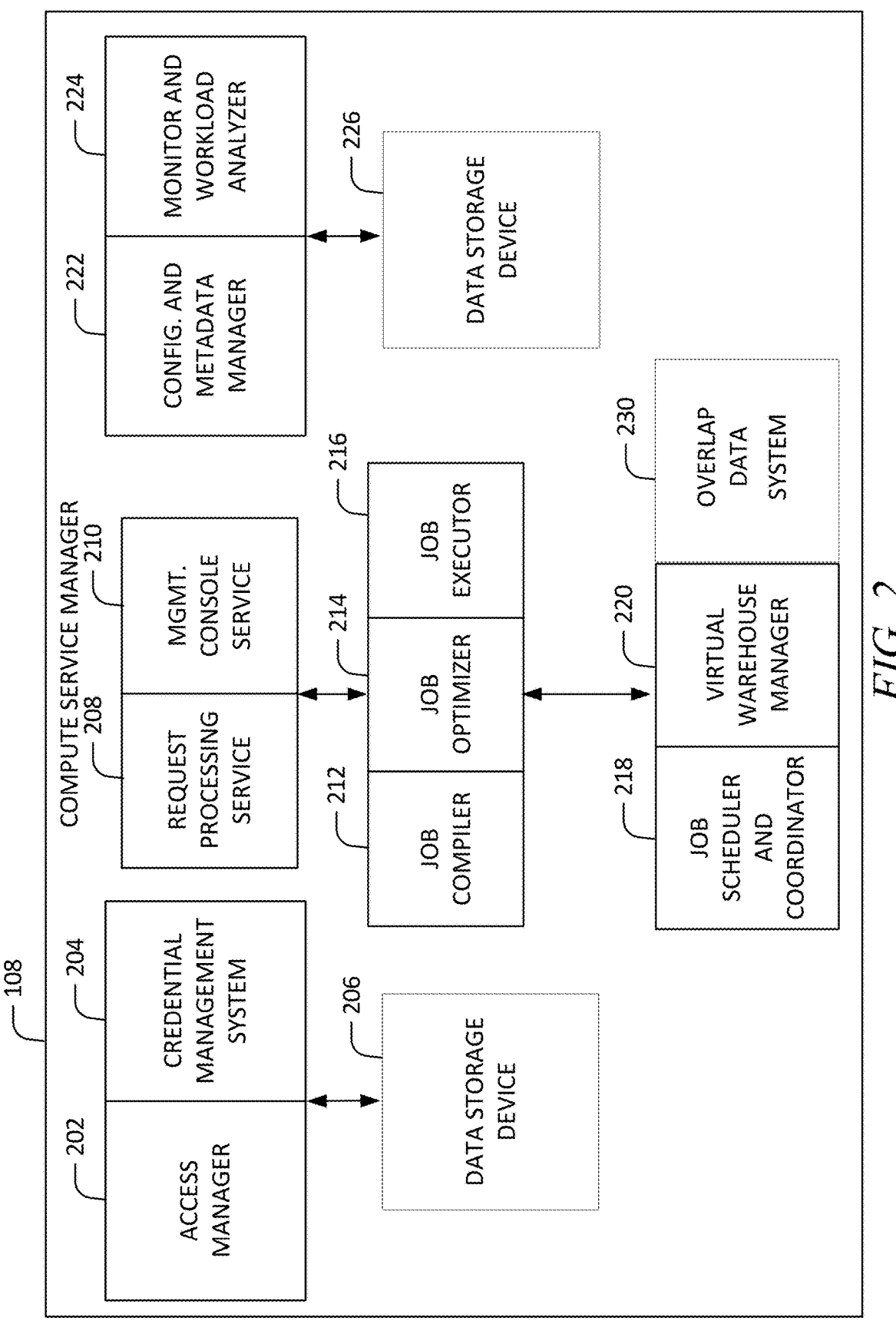
FIG. 2 is a block diagram illustrating components of a compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to data storage device 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., an access metadata database, a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110.

In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. An overlap data system 230 is configured to generate overlap results data using different user datasets, as discussed in further detail below.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2) and should be disallowed from communicating with a third execution node (e.g., execution node 312-1), and any such illicit communication can be recorded (e.g., in a log or other location). Also, the information stored on a given execution node is restricted to data relevant to the current query and any other data is unusable, rendered so by destruction or encryption where the key is unavailable.

Figure 3:
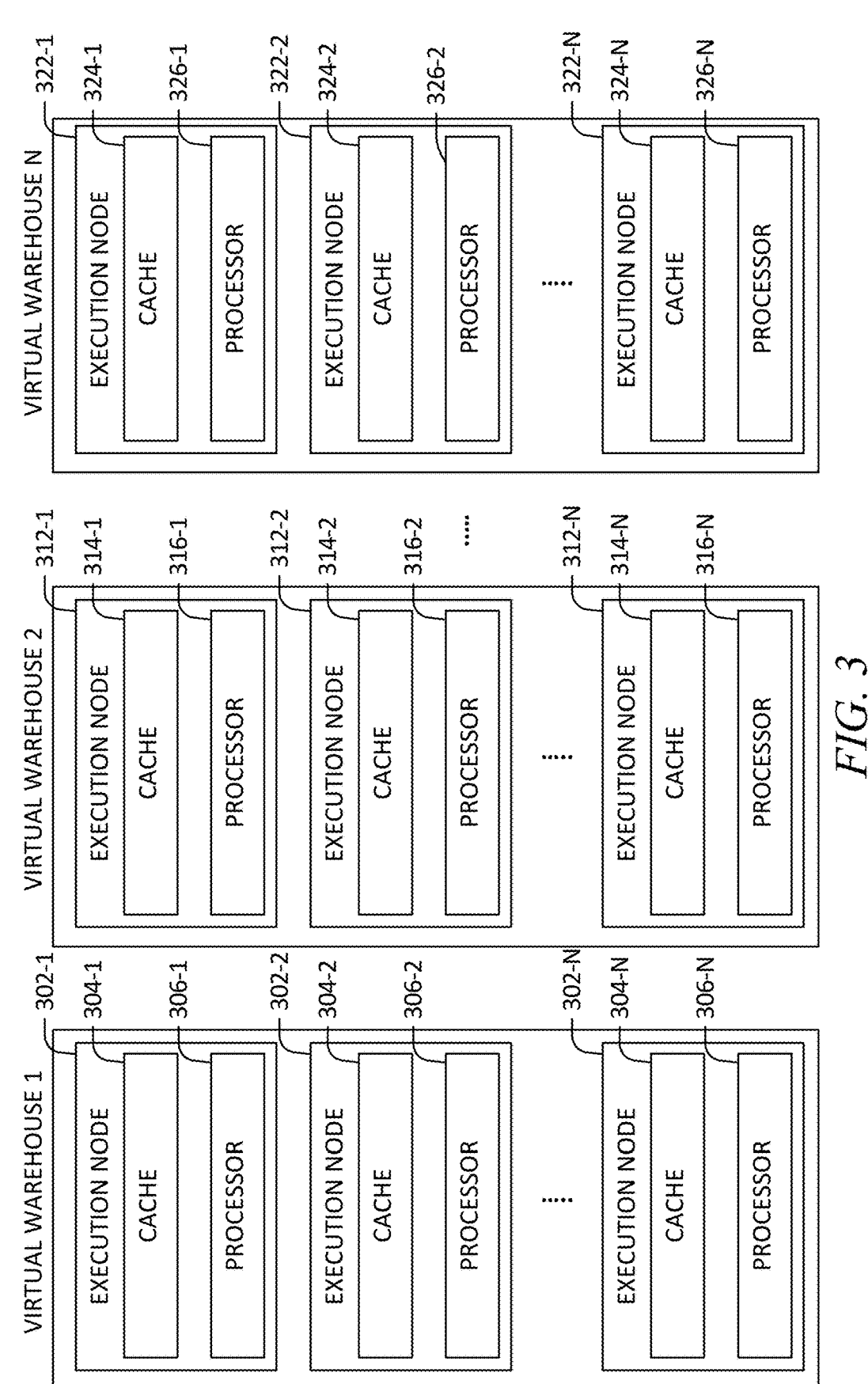
FIG. 3 is a block diagram illustrating components of an execution platform, according to some example embodiments.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4A:
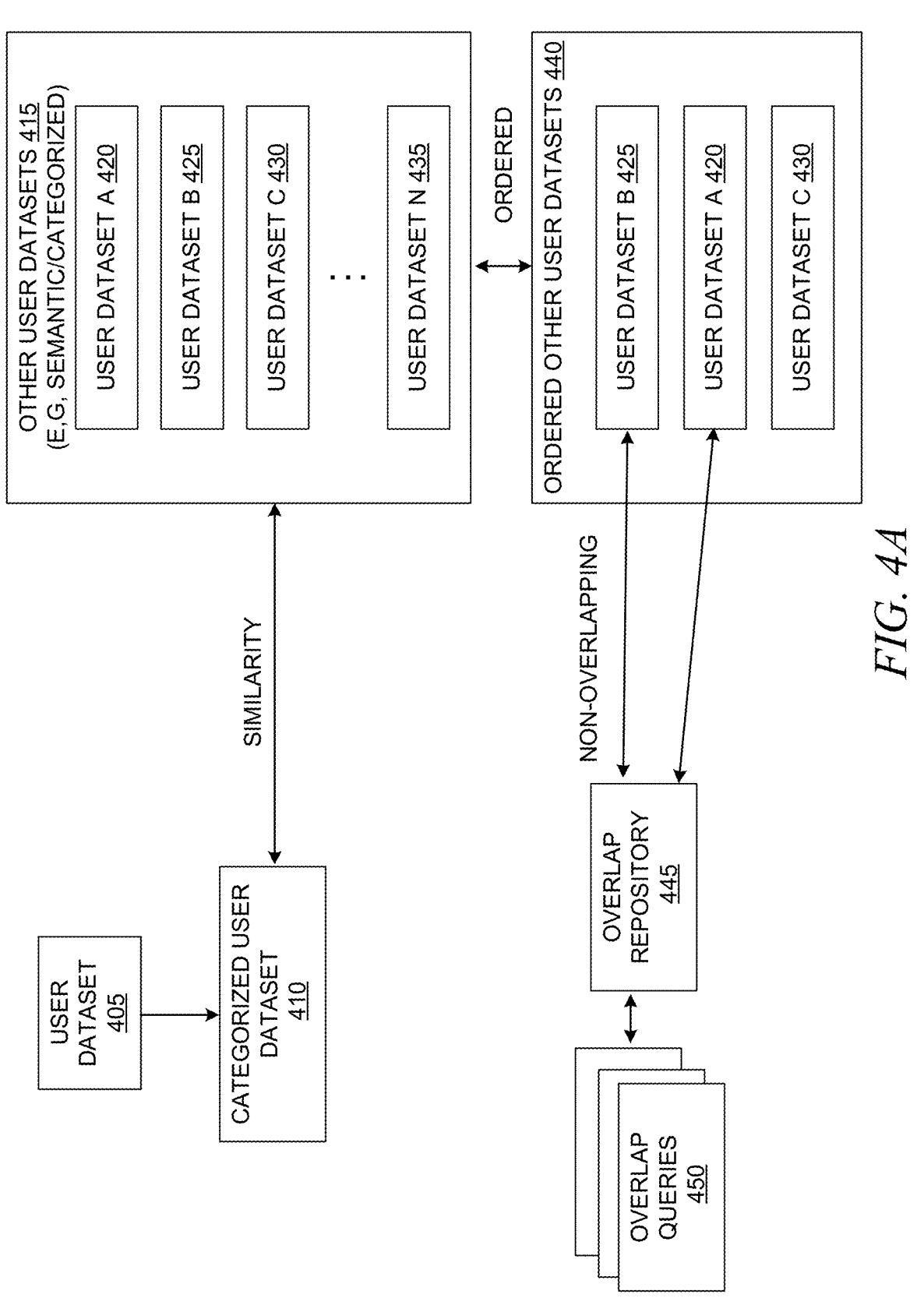
FIGS. 4A and 4B show data architectures for implementing overlap queries, according to some example embodiments.

FIG. 4A shows a data architecture for implementing overlap queries, according to some example embodiments. In the example, the overlap data system 230 performs categorization of a user dataset 405 to generate a categorized user dataset 410. For example, the overlap data system 230 performs semantic categorization of schema or column names of the user dataset 405 into different broader categories to generate the categorized user dataset 410.

In some example embodiments, the overlap data system 230 can automatically classify columnar data that is part of a dataset. Classification can allow customers an understanding of their data but also enables them to use a variety of data governance and data privacy tools, which can become more important as more privacy regulations become law around the world. As part of those regulations, it is imperative for customers to understand what personal data they have, where it is, how long they have had it, and how to protect it, while still deriving insights.

In some example embodiments, the overlap data system 230 retrieves data from a dataset, where the data is columnar data or can be extracted or transformed into columnar data. The overlap data system 230 further determines one or more semantic categories for each of the columns associated with the data. The semantic categories can be generated by examining the data using a variety of schemes to determine the one or more semantic categories. For example, the overlap data system 230 can apply whitelist and/or blacklist bloom filters, use a lookup table, and/or apply a range or a range and pattern. Different bloom filters or other schemes can be applied to the same column to generate multiple different candidate semantic categories for a single column.

In addition, the overlap data system 230 determines a probability for each of the candidate semantic categories. In one embodiment, the probability represents a possibility that the column data fits the associated semantic category. The overlap data system 230 further determines a column semantic category using the probabilities of the candidate semantic categories and a threshold. In some example embodiments, with the column semantic category determined for each column in the dataset, the overlap data system 230 assigns a privacy category to the dataset columns. Further, the overlap data system 230 can anonymize the data using the privacy categorizations of the dataset.

In some example embodiments, the overlap data system 230 then compares the categorized user dataset 410 against other user datasets 415, comprising user dataset A 420, user dataset B 425, user dataset C 430, and user dataset N 435. In some example embodiments, each of the user datasets in the other user datasets 415 has already been categorized by the overlap data system 230 (e.g., undergone semantic categorization to categorize schema or columns of each dataset). In some example embodiments, the overlap data system 230 can generate similarity data between the categorized user dataset 410 and each of the other user datasets 415 using different similarity mechanisms, such as quantity of matching columns, quantity of non-matching columns, unions, intersections, a Jaccard index, and/or cosine similarity, as examples.

To generate the ordered other user's dataset 440, the overlap data system 230 orders the other user datasets 415 based on the similarity data generated when comparing the categorized user dataset 410 to each the other user datasets 415. For example, each of the other user datasets may be ranked from highest to lowest, where the highest has the greatest number of matching columns to the categorized user dataset 410, or the highest in the rank has the highest Jaccard index score. In some example embodiments, the overlap data system 230 performs filtering to generate the ordered other users' dataset 440. The filtering can be performed using preset filters or rules that check whether a quality dataset would be generated if a joint operation is implemented between the categorized user dataset 410 and the instant other user's dataset (e.g., where quality output results including more than two matching rows would be output if the query was run against the joint dataset, and also checking whether the output of the joint dataset query would generate usable data). As illustrated in the example of FIG. 4A, user dataset N 435 has been dropped according to filtering, and user dataset B 425 has been ranked to a highest position using the one or more sorting mechanisms implemented by the overlap data system 230, as discussed above.

In some example embodiments, non-overlapping columns of each of the datasets in the ordered other users' dataset 440 is used to identify one or more rules and overlap repository 445. For example, the user dataset B 425 in the ordered other users' dataset 440 may have two columns that are non-matching with the categorized user dataset 410, and thus may be of interest for analysis for the user that manages the categorized user dataset 410 (e.g., to perform overlap analysis of users advertising data versus geographic data or other types of overlap research that can be generated from joins of the user dataset with other user datasets). In some example embodiments, each rule in the overlap repository 445 is manually input into the overlap repository 445 as a preconfigured rule or heuristic derived from examining queries of other user datasets having the same non-matching columns that are joined to perform overlap query analysis. For example, a rule can be implemented as an if/then statement: if a given set of overlapping columns exist between the user dataset in the first user dataset and a second users dataset, then recommend or otherwise include a given overlap query in the overlap queries 450. In some example embodiments, one or more rules of the overlap repository 445 are identified using a machine learning algorithm (e.g., classifier neural network) that is trained on historical queries of the database and non-matching data or semantic column names to generate classifications of the query to recommend as part of the overlap queries 450.

Figure 4B:
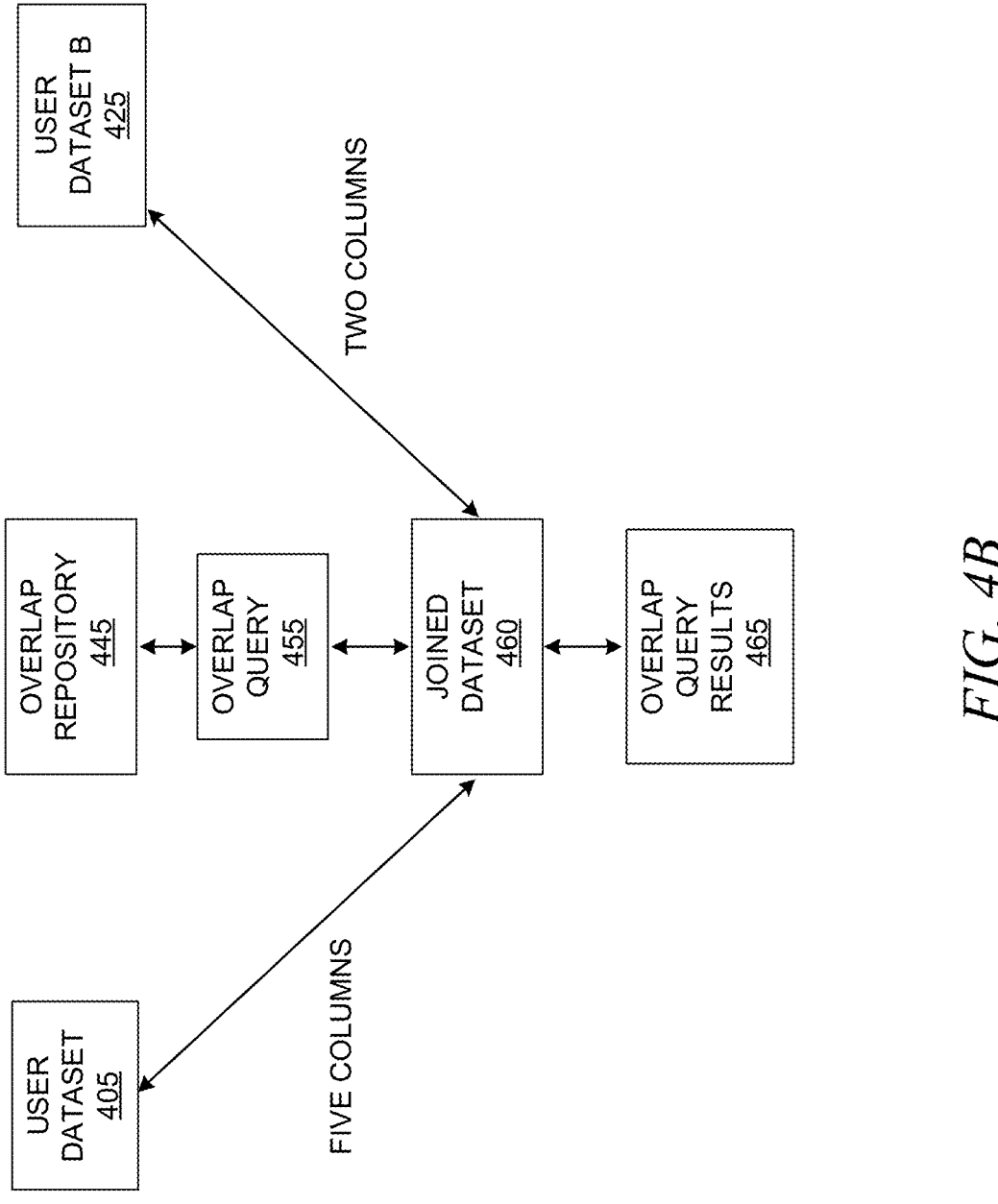

FIG. 4B shows a data architecture for implementing an overlap query on a join dataset, according to some example embodiments. As discussed above, a plurality of overlap queries 450 can be generated for recommendation to a user that owns and manages the user dataset 405 on the network-based database system 102. The user can select one or more of the overlap queries, such as overlap query 455 in FIG. 4B from the overlap repository 445. The overlap query 455 can be associated through the overlap repository 445 with user dataset B 425. Upon selection of the overlap query 455, the overlap data system 230 generates a joined dataset 460 comprising portions of the user dataset 405 and other portions of the user dataset B 425.

For example, the joined dataset 460 can be generated by performing a database join operation that uses five columns from user dataset 405 and two columns from user dataset B 425, then the network database system can generate results by implementing the overlap query 455 on the joined dataset 460 to generate overlap query results 465 (e.g., for analysis by the user that owns the user dataset 405).

Figure 5:
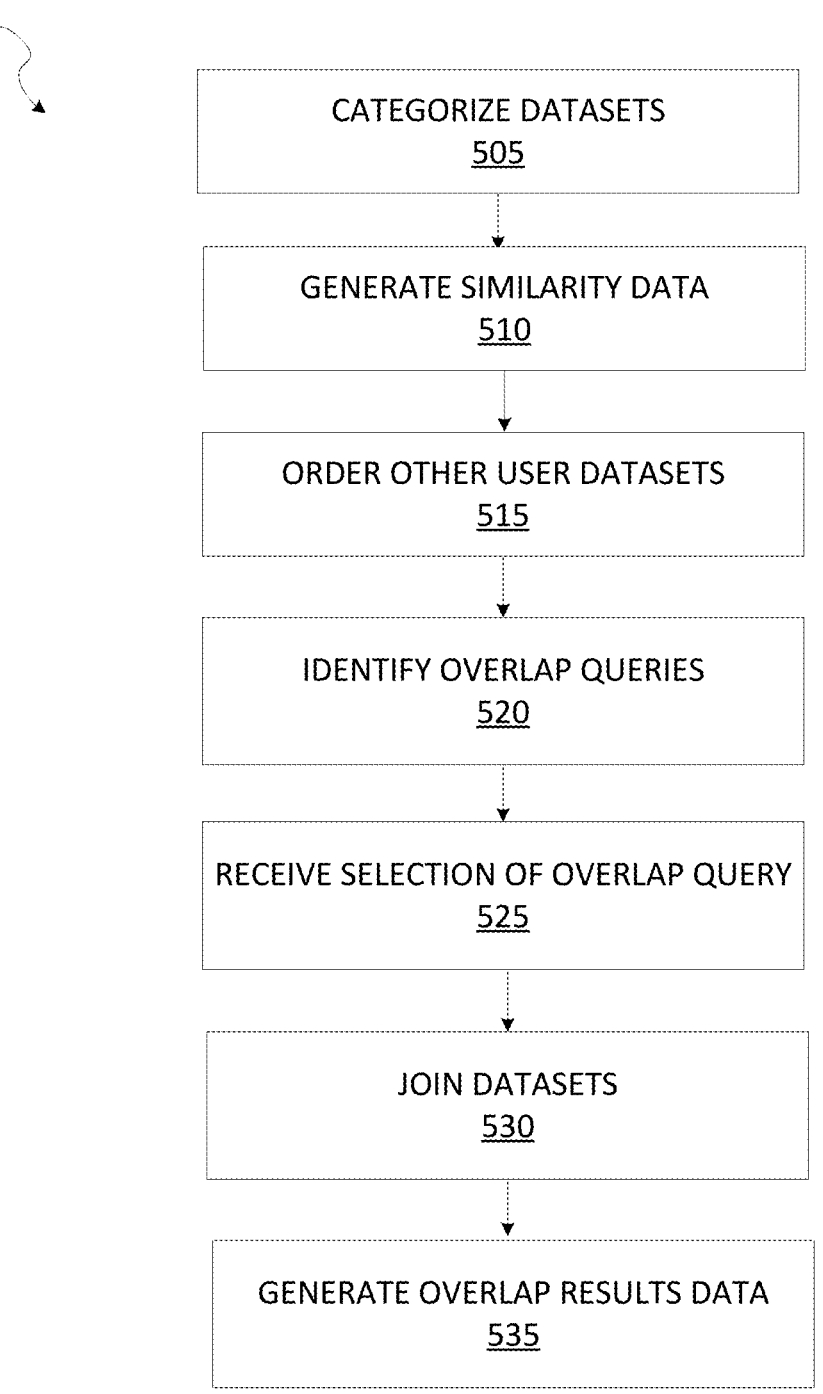
FIG. 5 shows a flow diagram of a method for implementing overlap queries, according to some example embodiments.

FIG. 5 shows a flow diagram of a method 500 for implementing overlap queries, according to some example embodiments. At operation 505, the overlap data system 230 categorizes datasets of the database. For example, at operation 505, the overlap data system 230 performs semantic categorization of each of the user dataset 405 and the other user datasets 415. At operation 510, the overlap data system 230 generates similarity data. For example, the overlap data system 230 compares the user dataset 410 to each of the other user datasets 415 to generate similarity data (e.g., a number of matching and nonmatching columns between the given user's dataset each dataset of other datasets of other users).

At operation 515, the overlap data system 230 orders the other user datasets. For example, the overlap data system 230 can sort and filter the other user datasets 415 to generate the ordered other users' dataset 440. At operation 520, the overlap data system 230 identifies one or more overlap queries. For example, at operation 520, the non-overlap matching data between the categorized user dataset 410 and the ordered other users' dataset 440 is linked or matches a rule condition of a rule in the overlap repository 445. For example, in FIG. 4A, user dataset B 425 and user dataset A 420 have non-overlap matching data that corresponds to one or more rules in the overlap repository 445 to identify overlap queries 450 that can successfully run on joined data (e.g., can successfully run according to the filtering rules that filter out user dataset N 435 and have a high number of matching results such as columns or rows).

At operation 525, the system receives selection of an overlap query. For example, at operation 525, the overlap data system 230 receives selection of overlap query 455, which is one of the overlap queries of the overlap queries 450 in FIG. 4A. At operation 530, the overlap data system 230 joins datasets in response to selection of an overlap query. For example, at operation 530, the overlap data system 230 generates the joined dataset 460 (e.g., a joined database table) by joining data from the user dataset 405 and joining other data from the user dataset B 425. At operation 535, the network-based database system 102 generates overlap results data. For example, the network-based database system 102 applies the selected overlap query of operation 525 to the joined dataset to generate query results.

As discussed above, in some example embodiments the overlap data system 230 implements a model (e.g., machine learning model) that is trained on end-user data to generate and refine recommendations for other users. For example, and in accordance with some example embodiments, the overlap data system 230 trains models from N end-users to make join and query recommendations for end-user N+1. In some example embodiments, the overlap data system 230 does not access end-user data (e.g., table data of a given customer), and instead only has access to and sees the table schemas, column metadata and queries by different users across the database platform 102. In some example embodiments, the query information comprises details describing which data was loaded as first party data as well as which data was consumed directly from shares coming from a data marketplace of the database system 102, or other sharing relationships that are external to the system 102. In some example embodiments, in addition to direct database joins, derivations of data coming from data shares are also observed. The overlap data system 230 leverages the patterns of these queries to train one or more models to generate predictions of which queries a customer can run on their first-party data to get valuable outcomes, which marketplace datasets could be joined with their first-party data assets, and even which first party data is missing to run even more important queries, in accordance with some example embodiments.

As an example, the overlap data system 230 observes that many customers join their primary inventory data of schema (a,b,c) to retail pricing data of a given provider account having schema (c,d,e,f). For instance, Customer X uploads data into a table with schema (a,b,c,d) and the overlap data system 230 recommends that Customer X try out the given provider's pricing data and also the overlap data system 230 generates and recommends useful queries that Customer X can use on this joined dataset.

As an additional example, the overlap data system 230 observes that many customers define data pipelines combining Provider A's pricing data with Provider B's supply chain data, and persist it in a table as a new derived dataset A. These customers then query derived dataset A, schema (a,g,h,i,j), joining their primary inventory data of schema (a,b,c) to measure the inventory at risk of supply chain disruption. Customer X uploads inventory data of schema (a,b,c). The overlap data system 230 can now not only recommend Provider A and Provider B's respective data sets for joining but can also recommend the transformations and final queries to do the useful supply chain risk analysis.

As an additional example, the overlap data system 230 observes that many customers load inventory data of schema (a,b,c) and client data (b,w,x,y,z) and then run queries joining this client inventory data with credit bureau data of schema (u,v,w). In this example, Customer X uploads their inventory data only of schema (a,b,c,d), and based on the patterns the machine learning rezoning model has encountered, the overlap data system 230 then recommends that Customer X upload a new table containing columns (b,w) which enables the Customer X to run valuable queries combining their first party inventory and the credit bureau's data. Further, in some example embodiments, Customer X is missing pieces of data to perform valuable joins and the overlap data system 230 recommends the data to supply to perform the joins. For example, the Customer X may be missing a table containing columns (b,w), and the overlap data system 230 then recommends candidate Provider datasets that contain the columns (b,w) from the overlap data system 230 to join so that further recommendations and joins can be recommended and implemented for further useful queries and analysis.

Figure 6:
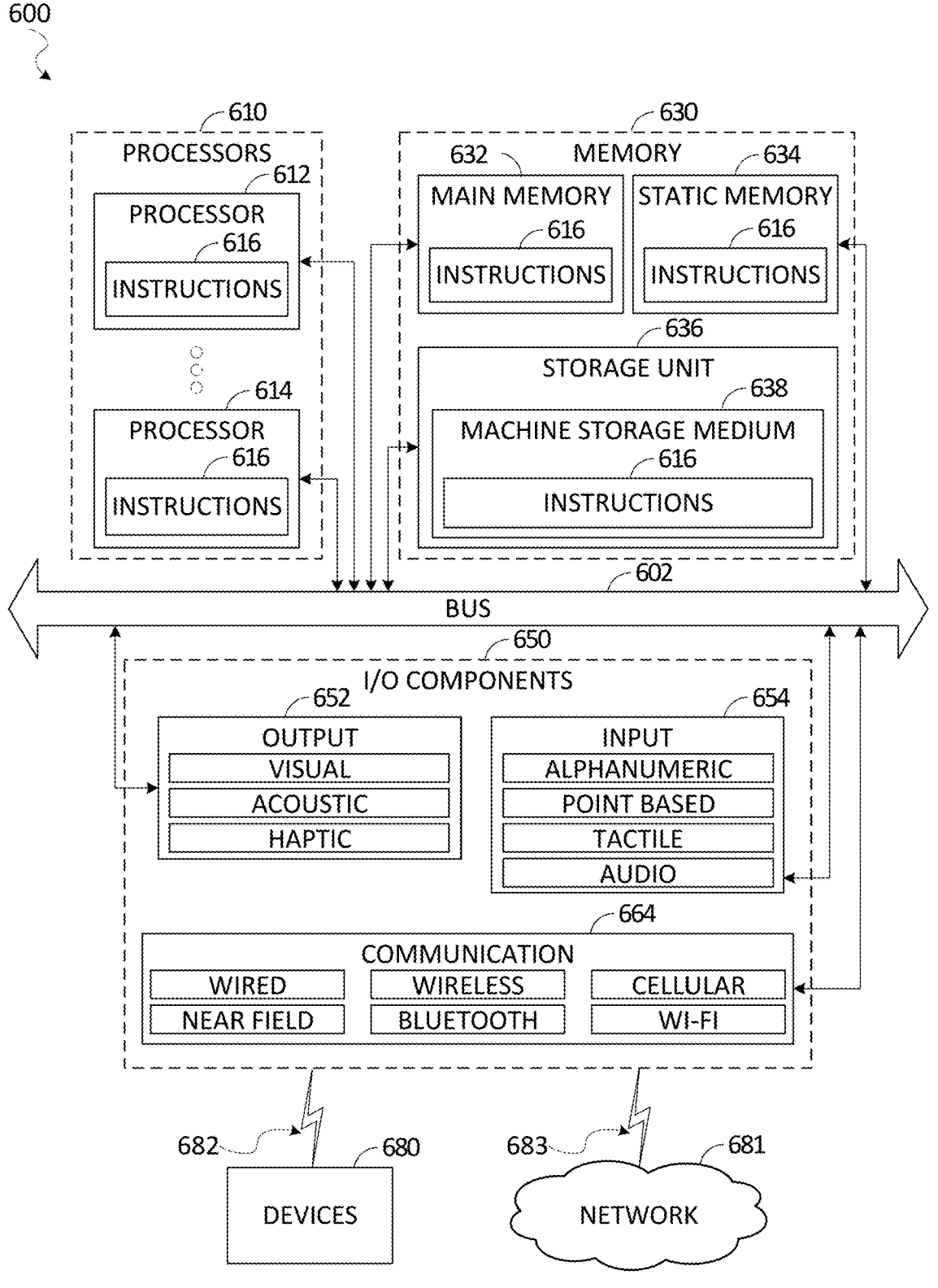
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute any one or more operations of any one or more of the methods described herein. As another example, the instructions 616 may cause the machine 600 to implemented portions of the data flows described herein. In this way, the instructions 616 transform a general, non-programmed machine into a particular machine 600 (e.g., the client device 114, the compute service manager 108, the execution platform 110) that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and input/output (I/O) components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 comprising a machine storage medium 638 may store the instructions 616 embodying any one or more of the methodologies or functions described herein. The instructions 616 may also reside, completely or partially, within the main memory 632, within the static memory 634, within the storage unit 636, within at least one of the processors 610

(e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 681 via a coupling 683 or to devices 680 via a coupling 682. For example, the communication components 664 may include a network interface component or another suitable device to interface with the network 681. In further examples, the communication components 664 may include wired communication components, wireless communication components, cellular communication components, and other communication components to provide communication via other modalities. The devices 680 may be another machine or any of a wide variety of peripheral devices (e.g., a peripheral device coupled via a universal serial bus (USB)). For example, as noted above, the machine 600 may correspond to any one of the client device 114, the compute service manager 108, the execution platform 110, and may include any other of these systems and devices.

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 681 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 681 or a portion of the network 681 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 681 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 682 (e.g., a peer-to-peer coupling) to the devices 680. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: identifying a user dataset on a distributed database, generating a similarity score dataset that indicates a similarity between the user dataset and a plurality of datasets of other users of the distributed database; generating a plurality of overlap queries that are configured to output overlap datasets between the user dataset and one or more of the plurality of datasets; and generating, using one or more processors of a machine, a results dataset by applying one or more of the plurality of overlap queries to a joined dataset comprising data from the user dataset and one of the plurality of datasets of other users on the distributed database.

Example 2. The method of example 1, wherein each overlap query is generated based on non-matching data between the user dataset and a corresponding dataset of the plurality of datasets.

Example 3. The method of any of examples 1 or 2, wherein the non-matching data comprises non-matching columns between the user dataset and the corresponding dataset of the plurality of datasets.

Example 4. The method of any of examples 1-3, wherein generating the plurality of overlap queries comprises identifying, from an overlap query repository, an overlap query that is associated with the non-matching data.

Example 5. The method of any of examples 1-4, wherein the overlap query repository comprises rules that match non-matching data to one or more overlap queries.

Example 6. The method of any of examples 1-5, wherein the rules are generated from a machine learning scheme configured to identify overlap queries of other database user.

Example 7. The method of any of examples 1-6, wherein each of the plurality of overlap queries comprises a join operation on the user dataset and a corresponding user dataset.

Example 8. The method of any of examples 1-7, further comprising: extracting semantic names from schema of the user dataset and the plurality of datasets.

Example 9. The method of any of examples 1-8, wherein the similarity is generated using the semantic names of the user dataset and the semantic names extracted from the plurality of datasets.

Example 10. The method of any of examples 1-9, wherein the schema comprises a plurality of column names and extracting the semantic names categorizes each column name into a semantic category.

Example 11. The method of any of examples 1-10, wherein the similarity is generated using an intersection of datasets.

Example 12. The method of any of examples 1-11, wherein the similarity is generated using a Jaccard index comprising an intersection and union of datasets.

Example 13. The method of any of examples 1-12, wherein the similarity is generated using cosine similarity.

Example 14. The method of any of examples 1-13, wherein the similarity is generated using a machine learning scheme that is trained on different datasets of the distributed database.

Example 15. The method of any of examples 1-14, wherein the machine learning scheme is a classifier neural network.

Example 16. A system comprising: one or more processors of a machine; and at least one memory storing instructions that, when executed by the one or more processors, cause the machine to perform operations implementing any of examples 1-15.

Example 17. A machine-readable storage device embodying instructions that, when executed by a machine, cause the machine to perform operations implementing any of examples 15.

What is claimed is:

1. A method comprising:
monitoring, by at least one hardware processor, a first user interaction with a first dataset on a database system, the first dataset being associated with a first user;
receiving, from the first user, feedback regarding a quality of a results dataset generated from an executed overlap query, the results dataset comprising a joined dataset of data from the first dataset of the first user and data from a second dataset of a second user;
based on the feedback, generating a similarity score dataset indicating a similarity between the first dataset and the second dataset;
generating, using the similarity score dataset, a new set of overlap queries specifying join operations between the first dataset and the second dataset;
executing the new set of overlap queries to materialize a new joined dataset comprising the data from the first dataset and the data from the second dataset, the materializing comprises persisting the new joined dataset as a physical table indexed and stored in the database system for subsequent reuse;
generating a new results dataset by applying the new set of overlap queries to the new joined dataset; and
providing, to the first user, the new results dataset comprising a refinement recommendation for the overlap queries based on additional user feedback, the refinement recommendation comprising a ranked set of proposed modifications to at least one join operation associated with the overlap queries.

2. The method of claim 1, wherein each overlap query is generated based on non-matching data between the first dataset and a corresponding dataset of the new joined dataset, the non-matching data comprises non-matching columns between the first dataset and the new joined dataset.

3. The method of claim 2, wherein generating the new set of overlap queries comprises identifying, from an overlap query repository, an overlap query that is associated with the non-matching data.

4. The method of claim 1, further comprising:
prior to generating the new joined dataset, executing a data cleaning process on the first dataset and the second dataset to ensure data quality and consistency.

5. The method of claim 1, wherein the feedback from the first user is received via an interactive user interface and further comprises:
enabling the first user to rate the quality of the results dataset on a predefined scale.

6. The method of claim 1, wherein the new set of overlap queries is generated based on a machine learning model that predicts potential utility of overlap datasets based on historical user feedback and query outcomes.

7. The method of claim 6, wherein the machine learning model is retrained periodically with new user feedback and results datasets to improve accuracy of the new set of overlap queries.

8. The method of claim 1, further comprising:

categorizing each dataset in the database system by a semantic type of a data field within each dataset, wherein the semantic type includes at least one of a ZIP code, a date, or a numerical identifier.

9. The method of claim 8, wherein generating the similarity score dataset includes comparing the semantic type of the first dataset with the semantic type of the second dataset to identify matching and non-matching data fields.

10. A system comprising:

one or more hardware processors; and one or more computer-readable mediums storing instructions that, when executed by the one or more hardware processors, cause the system to perform operations comprising:

monitoring a first user interaction with a first dataset on a database system, the first dataset being associated with a first user;

receiving, from the first user, feedback regarding a quality of a results dataset generated from an executed overlap query, the results dataset comprising a joined dataset of data from the first dataset of the first user and data from a second dataset of a second user;

based on the feedback, generating a similarity score dataset indicating a similarity between the first dataset and the second dataset;

generating, using the similarity score dataset, a new set of overlap queries specifying join operations between the first dataset and the second dataset;

executing the new set of overlap queries to materialize a new joined dataset comprising the data from the first dataset and the data from the second dataset, the materializing comprises persisting the new joined dataset as a physical table indexed and stored in the database system for subsequent reuse;

generating a new results dataset by applying the new set of overlap queries to the new joined dataset; and providing, to the first user, the new results dataset comprising a refinement recommendation for the overlap queries based on additional user feedback, the refinement recommendation comprising a ranked set of proposed modifications to at least one join operation associated with the overlap queries.

11. The system of claim 10, wherein each overlap query is generated based on non- matching data between the first dataset and a corresponding dataset of the new joined dataset, the non-matching data comprises non-matching columns between the first dataset and the new joined dataset.

12. The system of claim 10, the operations further comprising:

prior to generating the new joined dataset, executing a data cleaning process on the first dataset and the second dataset to ensure data quality and consistency.

13. The system of claim 10, wherein the feedback from the first user is received via an interactive user interface and the operations further comprising:

enabling the first user to rate the quality of the results dataset on a predefined scale.

14. The system of claim 10, wherein the new set of overlap queries is generated based on a machine learning model that predicts potential utility of overlap datasets based on historical user feedback and query outcomes, the machine learning model is retrained periodically with new user feedback and results datasets to improve accuracy of the new set of overlap queries.

15. The system of claim 10, the operations further comprising:

categorizing each dataset in the database system by a semantic type of a data field within each dataset, wherein the semantic type includes at least one of a ZIP code, a date, or a numerical identifier; and comparing the semantic type of the first dataset with the semantic type of the second dataset to identify matching and non-matching data fields.

16. A machine-readable storage device embodying instructions that, when executed by a machine, cause the machine to perform operations comprising:

monitoring a first user interaction with a first dataset on a database system, the first dataset being associated with a first user;

receiving, from the first user, feedback regarding a quality of a results dataset generated from an executed overlap query, the results dataset comprising a joined dataset of data from the first dataset of the first user and data from a second dataset of a second user;

based on the feedback, generating a similarity score dataset indicating a similarity between the first dataset and the second dataset;

generating, using the similarity score dataset, a new set of overlap queries specifying join operations between the first dataset and the second dataset;

executing the new set of overlap queries to materialize a new joined dataset comprising the data from the first dataset and the data from the second dataset, the materializing comprises persisting the new joined dataset as a physical table indexed and stored in the database system for subsequent reuse;

generating a new results dataset by applying the new set of overlap queries to the new joined dataset; and providing, to the first user, the new results dataset comprising a refinement recommendation for the overlap queries based on additional user feedback, the refinement recommendation comprising a ranked set of proposed modifications to at least one join operation associated with the overlap queries.

17. The machine-readable storage device of claim 16, wherein each overlap query is generated based on non-matching data between the first dataset and a corresponding dataset of the new joined dataset, the non-matching data comprises non-matching columns between the first dataset and the new joined dataset.

18. The machine-readable storage device of claim 16, the operations further comprising:

prior to generating the new joined dataset, executing a data cleaning process on the first dataset and the second dataset to ensure data quality and consistency.

19. The machine-readable storage device of claim 16, wherein the feedback from the first user is received via an interactive user interface and the operations further comprising:

enabling the first user to rate the quality of the results dataset on a predefined scale.

20. The machine-readable storage device of claim 16, the operations further comprising:

categorizing each dataset in the database system by a semantic type of a data field within each dataset, wherein the semantic type includes at least one of a ZIP code, a date, or a numerical identifier; and comparing the semantic type of the first dataset with the semantic type of the second dataset to identify matching and non-matching data fields.

* * * * *